Dec. 6, 1955   J. W. SMITH   2,725,922
SEAT ATTACHMENT FOR VEHICLES AND THE LIKE
Filed Dec. 3, 1951   2 Sheets-Sheet 2
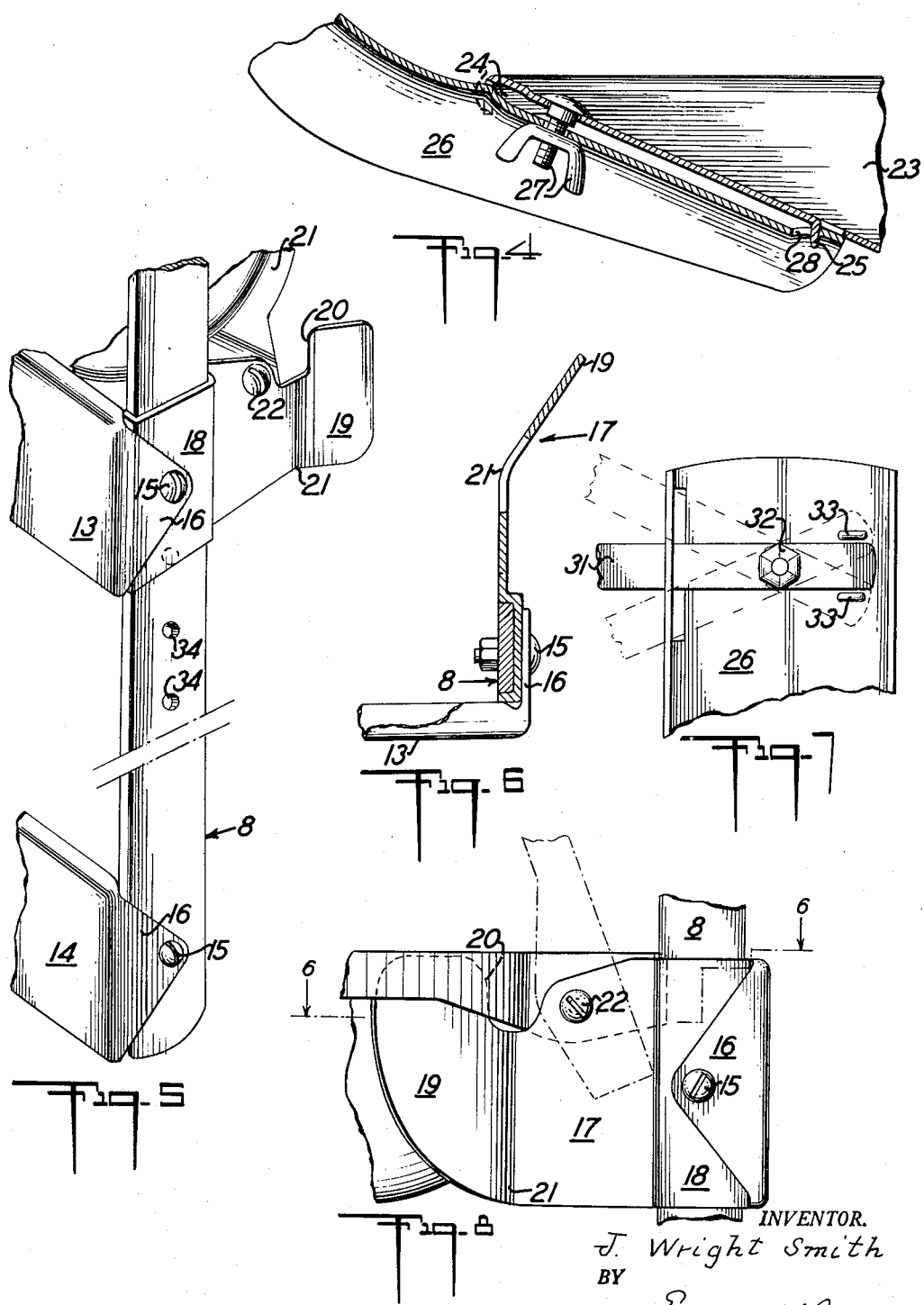
INVENTOR.
J. Wright Smith
BY
ATTORNEYS

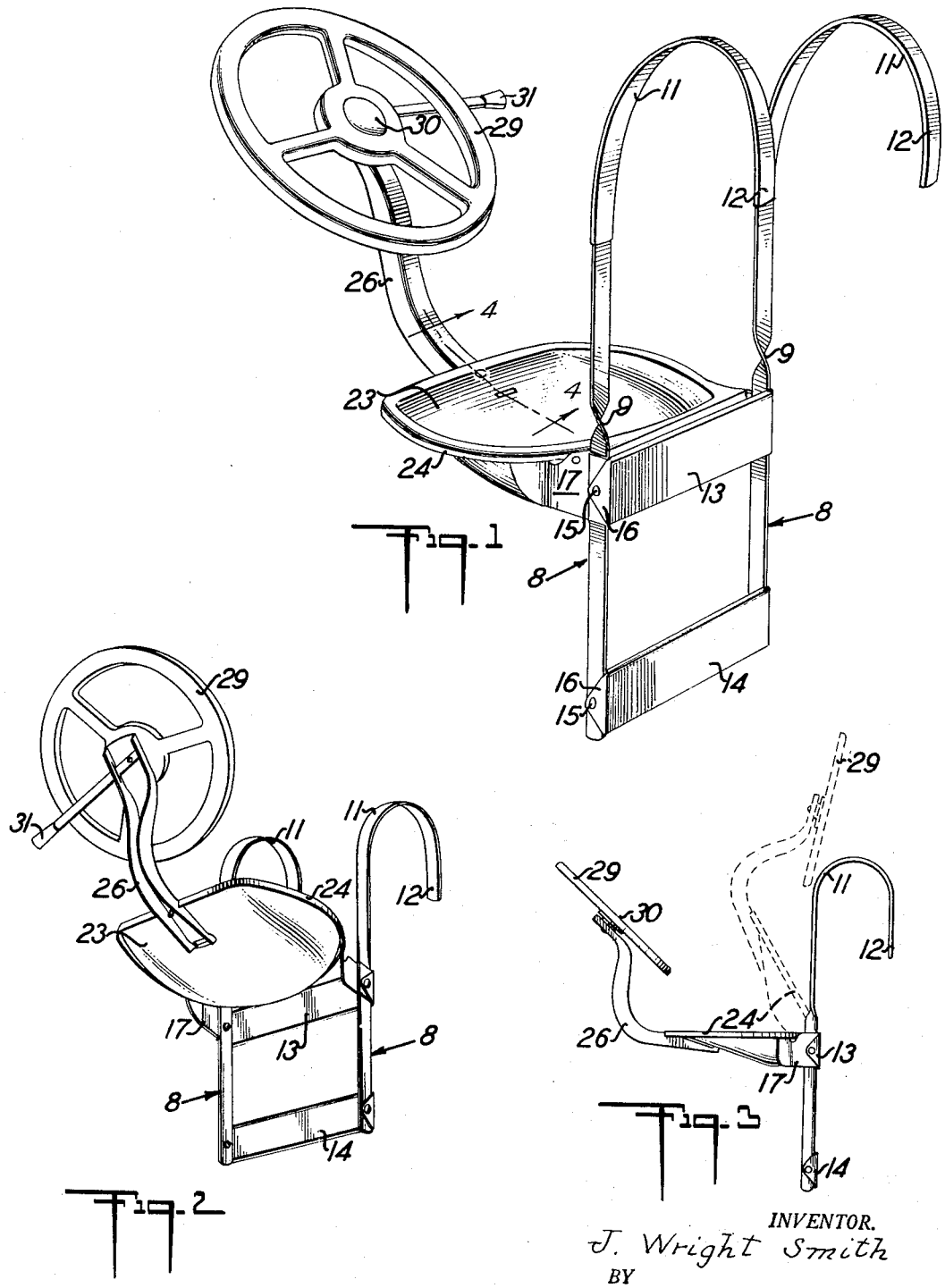

United States Patent Office 2,725,922
Patented Dec. 6, 1955

2,725,922

SEAT ATTACHMENT FOR VEHICLES AND THE LIKE

James W. Smith, Austin, Tex.

Application December 3, 1951, Serial No. 259,599

7 Claims. (Cl. 155—11)

This invention relates to a child's seat attachment and more particularly to an auxiliary seat to be removably suspended from any chair, sofa or the back portion of a vehicle seat to simulate the driving control of automobiles.

It is an object of the invention to provide an auxiliary seat for children which is foldable and which has a removable bracket arm for supporting a wheel and a shifting lever, both simulating an automobile steering wheel and gear shift lever.

A further object of the invention resides in a structure made of sheet metal and strip metal parts with a seat member which interfits into cross supports on a pair of flat frame members.

Further objects will be apparent from the following description when considered in connection with the accompanying drawings in which:

Figure 1 is a perspective view of the seat attachment viewed from the rear,

Fig. 2 is a perspective view of the attachment viewed from the bottom,

Fig. 3 is a side elevational view of the attachment,

Fig. 4 is a cross section of a portion of the seat and steering wheel arm taken on line 4—4 of Fig. 1, Fig. 5 is an isometric view of a detail of a part of one vertical frame member, Fig. 6 is a cross section of a detail taken on line 6—6 of Fig. 8, Fig. 7 is a bottom plane view of a part of the wheel arm and gear shift lever, and Fig. 8 is a side view of the detail of the seat support arms.

The frame of the auxiliary seat consists of two flat metal frame members 8, each bent at right angles at the point 9 to form an upper portion 10 with a semicircular loop part 11 forming a so-called hook. The hook portion is preferably covered with a sleeve 12 of a suitable material such as a fabric or plastic. Two cross pieces 13 and 14 are secured by means of bolts or screws 15 passing through bent end pieces 16, one, 14, at the ends of the members 8 and the other, 13, adjacent the bent portions 9. The loop portions 11 are preferably covered with the fabric or plastic sleeve to prevent wear or injury to the seat or sofa or other furniture from which the seat is suspended.

Each member 8 is provided with a projecting support 17 secured by means of the bolt 15 as best seen in Fig. 6. As clearly shown the support 17 is provided with a shallow U-shaped bracket section 18 which receives the member 8 and an outwardly bent ear or support 19 with a cut-out portion 20 in the top part at the bend 21. This support 17 is preferably made of rather thick sheet metal and as shown the pieces 13 and 14 are preferably channel-shaped to make these more rigid.

A seat is stamped from sheet metal and is hinged or pivoted at 22 to the support 17. The seat is provided with a shallow bowl part 23 and a rim section 24 forming the periphery of the seat, said section 24 is bent downward to render the seat rigid. A downwardly projecting lug 25 is stamped from the seat as best seen in Fig. 4.

An arm 26 of approximate U-shape is secured to the bottom surface of the seat, Fig. 4, and is secured by a winged nut bolt 27 with the lug 25 projecting through a perforation 28 in the end of the arm. A steering wheel 29 is secured to the arm 26 to be freely rotatable, and this wheel is preferably provided with a horn button 30. The wheel 29 may be made of sheet metal or any suitable plastic. On the under surface of the arm a lever 31 is pivotally secured by means of a bolt 32 which may also be used to secure the wheel 29. A pair of spaced projections 33, Fig. 7, are preferably stamped out of the arm 26 adjacent the point where the wheel 29 is rotatably mounted on the end of the arm. These projections 33 are for the purpose of forming resistance for the movement of the lever 31 limited by a slot 35 in the arm to the dotted line positions, Fig. 7, to simulate the action of a gear shift lever.

As shown in Fig. 5, the metal members 8 may each be provided with spaced holes 34 in order to adjust the position of the support elements 17, and thereby the height of the seat by means of the bolts 15.

The operation and adjustments of the seat attachment are believed to be obvious from the drawing and the foregoing description. As constructed the seat may be suspended over the back of an automobile seat or in fact any seat, sofa or settee in the home. The seat is merely suspended over the back of a chair or seat by means of the loop parts or hooks 11. The seat is pivotally mounted so that it can be folded back on its frame as shown in Fig. 3 in dotted lines, and in the position of use as shown in full lines. Also, the seat may be used with or without the steering wheel by removing the wing nut and bolt 27 to thus remove the arm 26. If desired, safety straps may be secured to the frame members 8 so that a child occupant of the seat may be securely fastened in the seat. The child occupant may, however, operate the steering wheel 29, the horn button 30 and the gear shift lever 31 to thus simulate actual driving conditions. The seat portion may be adjusted on the frame members by means of the bolts 15 and holes 34, Fig. 5, so that the seat may thus be raised or lowered.

It is of course obvious that the seat structure is capable of various modifications, and the various parts may be used in combination or conjointly within the scope of the appended claims.

I claim as my invention:

1. A seat attachment particularly to be suspended from the back portion of a vehicle seat, comprising a pair of flat metal frame members each having at one end a curved portion to hook over the back of a seat and a straight portion at the other end, a plurality of cross pieces secured to the straight portions of the frame members in spaced relationship to hold the frame members in spaced position, a projecting support member secured to each of the frame members, and a seat pivotally mounted on the projecting support members to rest on the latter in the position of the seat when occupied and which may be rotated on its pivots to fold the seat toward the frame members, said seat being supported by direct contact on the projecting support members and the pivots when the seat is in the non-folded position.

2. A seat attachment according to claim 1, in which each flat metal frame member is bent at right angles in the straight portions thereof in the longitudinal direction of the length of the frame members so that the lower parts of the frame members will lie at right angles to the back of the vehicle seat and the curved portions will lie flat on the upper part of the back of the vehicle seat.

3. A seat attachment according to claim 1, in which means are provided including an arm secured to the seat at one end, and in which means are provided on the seat and arm to removably secure the arm to the undersurface of the seat.

4. A seat attachment particularly for motor vehicle seats, comprising a pair of flat frame members each having at one end a curved portion in the form of a hook to rest on the upper edge of the back of the vehicle seat, each of said frame members having a straight portion at the other end integral with the curved portion, a pair of cross pieces, one secured to the said other ends of the frame members and the other secured to the frame members at the approximate mid-section of the straight portion, said cross pieces maintaining the frame members in spaced relationship and forming with said frame members a rigid structure, a projecting support member secured to each of said frame members at the point where the cross piece is secured to the mid-section by the same means which secures the mid cross piece to the frame members, and a seat member pivotally mounted and secured to the projecting support members, each of said support members having a cut-out portion into which a peripheral edge of the seat is adapted to rest when the latter is in the position to be occupied.

5. A seat attachment according to claim 4, in which each flat frame member is bent at right angles at the point which is adjacent the mid-cross piece so that the curved portion of each frame member will lie flat on the upper edge of the vehicle seat and the straight portion of each frame member below the right angle bend will rest at right angles relative to the side of the back of the vehicle seat.

6. A seat attachment according to claim 4, in which each flat frame member is bent at right angles at the point which is adjacent the mid-cross piece so that the curved portion of each frame member will lie flat on the upper edge of the vehicle seat and the straight portion of each frame member below the right angle bend will rest at right angles relative to the side of the back of the vehicle seat, said cross pieces being secured on the frame members on one side to rest against the back of the vehicle seat and the seat member projecting from the other side of the frame members.

7. A seat attachment according to claim 4, in which each curved portion of the frame member is provided with a plastic sleeve to protect the upper edge of the back of the vehicle seat.

References Cited in the file of this patent

UNITED STATES PATENTS

| | | |
|---|---|---|
| D. 147,884 | Bitter | Nov. 18, 1947 |
| D. 167,287 | Smith | July 15, 1952 |
| 883,330 | McClanahan | Mar. 31, 1908 |
| 1,039,647 | Carter | Sept. 24, 1912 |
| 2,079,176 | McNally | May 4, 1937 |
| 2,128,435 | Shippee et al. | Aug. 30, 1938 |
| 2,322,403 | Van Der Kieft | June 22, 1943 |
| 2,633,906 | Franz | Apr. 7, 1953 |